June 24, 1930. A. E. LINENDOLL 1,767,383
VALVE CONSTRUCTION FOR AUTOMOBILE HEATERS
Filed Jan. 22, 1926 2 Sheets-Sheet 2
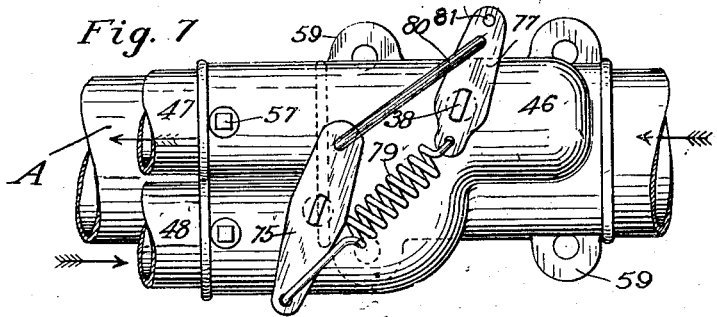
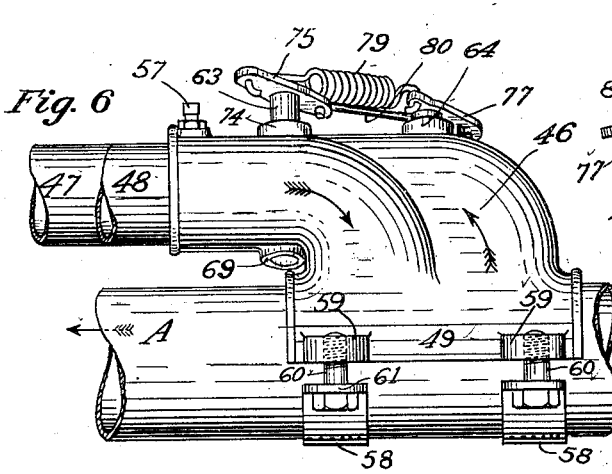
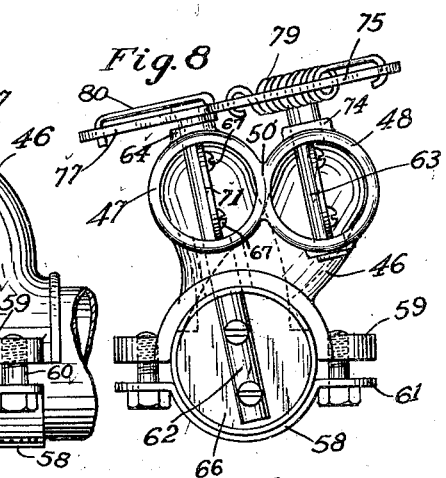
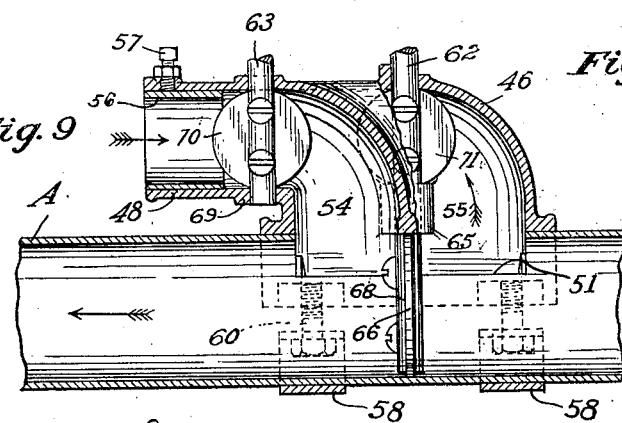
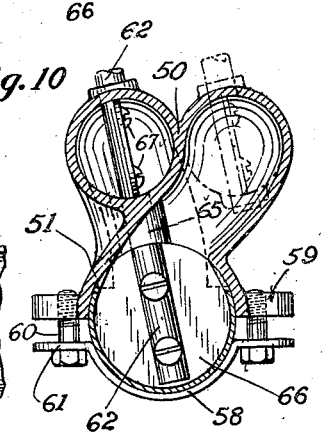
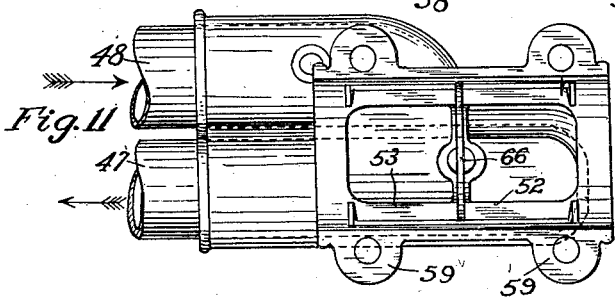
INVENTOR
Asa E. Linendoll
BY Frank D. Gray
ATTORNEY Patented June 24, 1930

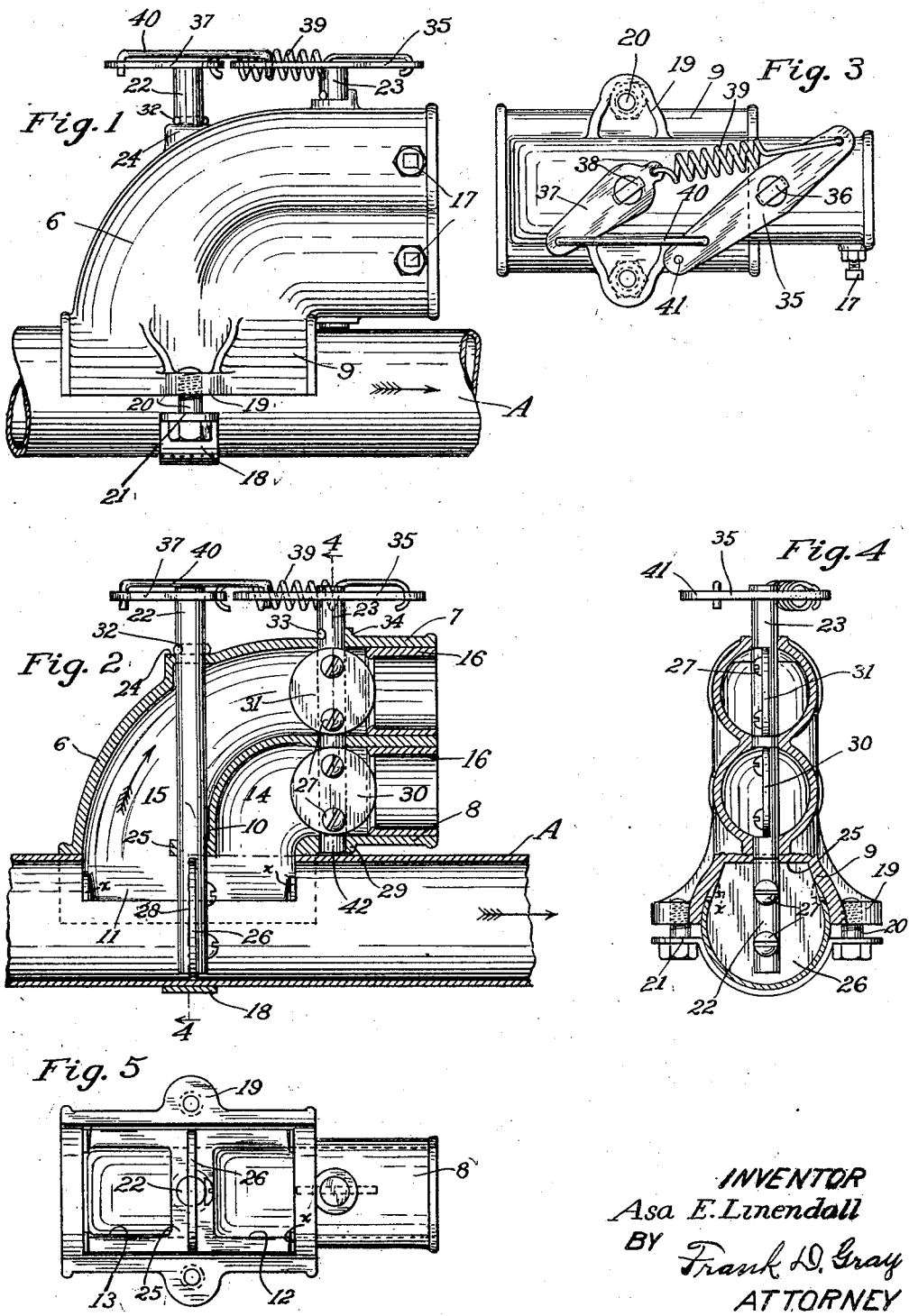

1,767,383

UNITED STATES PATENT OFFICE

ASA E. LINENDOLL, OF NORWALK, OHIO

VALVE CONSTRUCTION FOR AUTOMOBILE HEATERS

Application filed January 22, 1926. Serial No. 82,914.

This invention relates to valve construction for automobile heaters and more especially to such construction that is adapted to be mounted upon the exhaust pipe from an internal combustion engine and by providing an opening in such pipe will enable the hot gases therefrom to be directed through the radiator of a heater in a vehicle, and then returned to the said pipe opening and discharged from the pipe in the usual manner.

It is a special object of my present invention to mount valves in both the inflow pipes and the return pipe (using these terms with reference to the radiator to which they lead), forming a part of the valve construction, as well as a valve in the exhaust pipe itself, but supported by said construction, and control all these valves by common actuating mechanism, so that the connected pipes will both be closed when the exhaust pipe is open, and open when the exhaust pipe is closed.

The invention consists further in the matters hereinafter described, recited in the appended claims, and illustrated in the accompanying drawings in which—

Figure 1 is a side elevation of my new and improved valve mechanism shown mounted upon an exhaust pipe;

Figure 2 is a longitudinal, vertical section of the same;

Figure 3 is a plan view of the valve;

Figure 4 is a transverse section taken on the broken line 4—4 of Fig. 2;

Figure 5 is a bottom plan of the valve construction;

Figure 6 is a side elevation of a modified form of the construction shown in Fig. 1;

Figure 7 is a plan view thereof corresponding to Fig. 3;

Figure 8 is an end elevation of Fig. 6;

Figure 9 is a vertical section corresponding to Fig. 2, but showing the parallel pipes of the valve structure, each in longitudinal section;

Figure 10 is a transverse vertical section of the valve construction and exhaust pipe, and Figure 11 is a bottom plan view of the valve construction.

Like parts are designated by the same reference characters throughout the several views.

A radiator is assumed to be mounted within or beneath a vehicle which it is desired to heat by the exhaust gases from the internal combustion engine which is to drive the vehicle. A conventional arrangement of pipes, preferably of the flexible type, is used to connect my valve construction with said heater to cause a flow of the gases into the heater from one pipe and out thereof through the other pipe. Since the heater and these connected pipes are not part of my invention and are not claimed, no further details of their construction are given in this description.

In the drawings, A designates the exhaust pipe in which an elongated opening 11 has been made and over which my improved valve 6 is seated having a base opening divided into the two openings 12 and 13 by the flat valve member 26 mounted in the central, longitudinal slot 28 of the vertical stem 22 for operating the same. My device 6 consists of a casting shaped somewhat like an elbow and comprising two pipe ends 7 and 8 separated within the casting by a partition 10 having its inner end bent downward toward the exhaust pipe, as shown in Fig. 2, where said end is provided with a bent portion apertured to form a bearing 25 for the stem 22.

The said casting is provided with a semi-cylindrical base 9 extending over a larger area than the opening 11, and resting on the pipe A, there being protuberances $x$ at the corners of the openings in the casting which neatly fit the corners in the exhaust pipe opening 11 to properly hold the casting in alined position over the latter opening. Numerals 14 and 15 designate respective passages in the pipes 8 and 7. The lower edges of the concavo-convex base 9 are provided with lips 19 through an aperture of which one or more bolts 20 are passed and fastened in apertured ends 21 of a band 18, or a plurality of them, tightened below the exhaust pipe A. Small steel sleeves 16 may be fitted in the pipes 7 and 8, as indicated in Fig. 2, and may be secured in the ends of said pipes by screw fasteners 17.

Mounted in the pipes 7 and 8 and transverse of their walls and piercing them is a valve stem 23 having flattened portions within said pipes for receiving thereon disc valve plates 30 and 31 which are secured to the stem by attaching means such as screws 27. The lower wall of the pipe 8 is thickened at 29 about the aperture for receiving the end 42 of the stem 23, and the outer surface of the pipe 7 has about the bearing aperture a shoulder 34 against which the pin 33 strikes when the stem 23 has been rocked so far as the proper actuation of the valves requires. A similar pin 32 is provided upon the stem 22 which bears upon a protuberance 24 about the aperture in which the stem rocks.

The several valves 26, 30 and 31 are actuated in unison by connected mechanism comprising levers 35 and 37 fitted on the ends 36 and 38, respectively, of the stems 23 and 22, said levers being connected by a link 40, the opposite ends of the levers being connected by the coil spring 39 which, by reason of the different lengths of the levers to which the spring is attached, tends to normally hold the levers and with them their stems and valves mounted thereon, in the position in which the valve 26 is open, while the valves 30 and 31 are closed, thereby cutting off the heater in the car from the branch pipes 7 and 8 of the attached valve structure here shown. Suitable actuating means for the valves may however be provided and may comprise a wire or rod attached at 41 to the extreme end of the lever 35 beyond the point of connection of the latter with the link 40. Fig. 3 of the drawings shows the levers so actuated by the means connected to 41 as to close valve 26 and open valves 30 and 31.

From the above description it will be readily understood that pulling the rod (not shown), from the driver's seat in a forward direction, as will be the direction towards the left as shown in Figs. 1, 2 and 3 of the drawings, will rock the valve stems 22 and 23 in a clock-wise direction as they are shown in Fig. 3, and will stretch the spring 39 to the position shown in the latter view, since the lever 35 is longer than 37, so that levers, stems and valves will return to the normal position when the actuating strain applied at 41 is relieved. Figs. 1-4 show the spring 39 expanded to its greatest extent, and the lever 35 swung by the actuating rod connected at 41 to the farthest position to fully open valves 30 and 31. This improved construction provides positive closing for each of the independent pipes 7 and 8 connected with the heater in the car, as well as at the same time positively opening and closing the exhaust pipe A to which the valve casting is attached. I therefore attain all the advantages to be derived from actuating an independent valve plate in each of the three pipes, and at the same time provide a unitary casting for positively directing the hot gases from the pipe A to the heater and returning them to the exhaust pipe A.

In Figs. 7 to 11 I have shown a similar construction in which the two pipes 47 and 48 leading to the heater in the car are also parallel but arranged in a plane at right angles to the plane passing vertically through the exhaust pipe A. Usually these pipes 47 and 48 will be arranged horizontally. In this modified construction the casting 46 is mounted over the opening 51 in the pipe A and has a base opening divided by the valve member 66 into the two openings 53 and 52, and pipes 47 and 48 are separated by the partition 50 to provide the channels 54 and 55, the return pipe 48 being somewhat offset from the plane of the branch 47 and the exhaust A. The casting 46 rests upon the base 49 and is secured upon the exhaust pipe A by the straps 58 attached by the parts 59, 60 and 61, as shown. The sleeves 56 are secured in the ends of the pipes by screw fasteners 57.

In this modification one common stem 62 serves for mounting the valve plate 71 in the branch 47, as well as the larger valve 66 in the exhaust pipe A, though one of these valves is at right angles to the other, the valve plate 71 being secured on the stem by screws 67. Another stem 63 is employed to mount the valve plate 70 in the return branch 48, the latter stem being mounted in reinforced bearings 69 and 74 of the walls of 48, while the stem 62 is mounted in reinforced bearing 64 of pipe 47. The lower end of the partition 50 is provided with a bearing 65 for mounting the stem 62 securely for rocking movement on its axis. The valve plate 66 in this form is mounted in a longitudinal slot 68 in much the same manner as the valve 26 is mounted in the other form. Shoulders may be formed on the bearings 64 and 74 in this form to avoid rocking of the stems through too great an angle.

The valve stems are actuated by common control means as in the preferred form. Levers 75 and 77 are mounted on the ends of the stems 63 and 62, respectively, and the levers connected by the link 80 at one end, and by the expansible spring 79 at the other end. The spring tends to hold the valves in normal position—with the valve 66 open and the valves 70 and 71 closed. A rod connected with one of the levers, as at the point 81 of the lever 77, may lead to the driver's seat or other convenient point in the vehicle, which may be used by pulling toward the engine to overcome the strength of the spring 79 and rock the stems and their levers in common to turn the valves in position in which the valve 66 will be closed and the valves 70 and 71 open. This is the position in which the parts are shown in Figs. 7 to 11.

Operation: An opening having been made in the exhaust pipe A of an internal combustion engine, either form of my valve casting is seated over such opening and the straps 18 or 58 applied underneath the pipe and tightened into clamping action by the bolts. The branch pipes 7 and 8 of the first form, or pipes 47 and 48 of the other, are connected with a heater by suitable tubing, and valves provided for both the branch pipes and the exhaust pipe together with actuating mechanism so that, when the valve 26 or 66 of the exhaust pipe is open, the valves in the branch pipes are closed, which is the normal position of the valves, stems, and levers when the springs 39 or 79 are contracted to the utmost. In this position there is an absolute disconnection of the heater from the exhaust pipe. The closing of the branches—both of them, is positive, and so will remain unless some of the levers or stems are positively actuated by an outside force. When it is desired to direct the hot gases into the heater radiator, the actuating means connected to the lever at 41 or 81, is operated to move the latter parts toward the left in Fig. 3 or toward the right in Fig. 7, to move the parts into the relative position shown in all the views, whereby the exhaust valve member 26 or 66 is turned to closing position, and the other valves are opened. This relation is designed to direct the gases of the pipe A through the chamber 15 or 55 and return the same into the chamber 14 or 54, thus returning the heating gases to the exhaust pipe from which they were taken. The link 40 or 80 causes the two levers to move in unison, so that no one of the valve members can be moved without turning the others also.

It is to be noted from this disclosure that the valve members in the branch pipes are mounted positively above the exhaust pipe and remain in the said branch pipes when the casting 6 or 46 is taken off. The valve member 26 or 66, however, is carried by and suspended from the casting and is inserted into the opening 11 or 51 of the exhaust pipe A when the casting is applied thereto. Anyone of these three valve members may therefore be removed temporarily and repaired without interfering with the movement of the other two.

It will be apparent that I have devised a novel and improved device which is simple in construction and convenient in application to an exhaust pipe from an engine, and without severing the exhaust pipe or directing the gases from the heater directly into the air below the car, but that the gases discharged from the heater are returned to the exhaust pipe from which they may be emitted in the usual way, with or without a muffler.

Having thus described my invention, what I claim and desire to secure by Letters Patent of the United States, is—

1. A valve fitting provided with a base flange shaped to fit over an opening in an exhaust pipe, an internal chamber divided longitudinally by a partition into parallel passages both connected with said opening and leading to separate branch pipes, valve stems mounted to intersect said opening and said passages, respectively, valve members mounted on said stems, and mechanism common to the said stems for actuating in unison the valve members carried thereby.

2. A valve fitting having a base opening and a plurality of branch openings, means for clamping the fitting upon an exhaust pipe with the base opening in registry with an opening in said pipe, a partition in said fitting separating said branch openings and extending to and dividing said base opening, a valve stem mounted in the said extension of the partition and carrying a valve disk on its lower end suspended in said exhaust pipe through the opening therein, valves in said branch openings and common means, including said stem, for actuating all of said valve members in unison.

3. A valve comprising a casing having an opening in its bottom and two ports leading therefrom, a partition dividing the interior of said casing into passages communicating respectively with said ports, said partition extending to said opening to divide the same at the inner ends of said passages, means for securing said casing over an apertured portion of a pipe with the opening in registry with the pipe aperture, a disc plate pivotally mounted within said pipe on an axis intersecting said opening and said aperture and movable so that in its transverse position both said passages communicate with the pipe but on opposite sides of the disc, a disc plate mounted in one of said branches, the relation of the discs being such that when one is in the open position the other is closed and vice versa, and means for actuating the discs in unison.

4. A valve fitting having a base opening and a plurality of branch openings, means for clamping the fitting upon an exhaust pipe with the base opening in registry with an opening in said pipe, a partition in said fitting separating said branch openings and extending to and dividing said base opening, a valve stem mounted in said extension and carrying a valve disc on its lower end suspended in said exhaust pipe through the opening therein, a unitary valve stem intersecting both said branch openings and carrying valve discs movable to open or close said openings, levers for operating each of said stems, and connecting actuating means for moving said levers.

In testimony whereof I hereunto affix my signature.

ASA E. LINENDOLL.